United States Patent
Ortiz, Jr.

(10) Patent No.: US 10,887,399 B2
(45) Date of Patent: Jan. 5, 2021

(54) SYSTEM, METHOD, AND COMPUTER PROGRAM PRODUCT FOR MANAGING A CONNECTION BETWEEN A DEVICE AND A NETWORK

(75) Inventor: Efrain Ortiz, Jr., Conshohocken, PA (US)

(73) Assignee: McAfee, LLC, San Jose, CA (US)

( * ) Notice: Subject to any disclaimer, the term of this patent is extended or adjusted under 35 U.S.C. 154(b) by 632 days.

(21) Appl. No.: 12/182,634

(22) Filed: Jul. 30, 2008

(65) Prior Publication Data
US 2013/0246621 A1    Sep. 19, 2013

(51) Int. Cl.
*G06F 15/173* (2006.01)
*H04L 29/08* (2006.01)

(52) U.S. Cl.
CPC .................. *H04L 67/14* (2013.01)

(58) Field of Classification Search
CPC . H04L 63/08; H04L 63/0227; H04L 63/1433; H04L 63/145; H04L 63/1408; H04L 67/02; H04L 67/06; H04L 63/0236; H04L 12/585; H04L 67/14
USPC .................................. 709/225, 238
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,965,928 B1* | 11/2005 | Cox | H04L 41/082 709/203 |
| 7,506,155 B1 | 3/2009 | Stewart et al. | |
| 7,610,624 B1* | 10/2009 | Brothers | H04L 63/145 709/223 |
| 8,402,528 B1* | 3/2013 | McCorkendale | G06F 8/65 726/11 |
| 2004/0044771 A1* | 3/2004 | Allred et al. | 709/227 |
| 2004/0088570 A1* | 5/2004 | Roberts et al. | 713/201 |
| 2004/0098482 A1* | 5/2004 | Asano | H04L 63/145 709/225 |
| 2005/0086533 A1* | 4/2005 | Hsieh | 713/201 |
| 2005/0097199 A1* | 5/2005 | Woodard | H04L 67/125 709/223 |
| 2005/0135382 A1* | 6/2005 | Ross | H04L 12/66 370/395.52 |
| 2005/0153683 A1* | 7/2005 | Gustafsson | 455/411 |
| 2006/0259819 A1* | 11/2006 | Connor | G06F 21/10 714/38.14 |
| 2006/0262087 A1* | 11/2006 | Hanson et al. | 345/156 |
| 2007/0022474 A1* | 1/2007 | Rowett | H04L 63/0218 726/11 |

(Continued)

OTHER PUBLICATIONS

Linksys, "User Guide: Wireless-G Broadband Router", 2008, Cisco, p. 1-41.*

(Continued)

*Primary Examiner* — Taylor A Elfervig
(74) *Attorney, Agent, or Firm* — Patent Capital Group

(57) ABSTRACT

A system, method, and computer program product are provided for managing a connection between a device and a network. In use, a first device coupled between a second device and a network is identified. Further, the first device is controlled based on predefined criteria utilizing the second device, for managing a connection between the second device and the network.

20 Claims, 5 Drawing Sheets

(56) References Cited

U.S. PATENT DOCUMENTS

| | | | |
|---|---|---|---|
| 2007/0067682 A1* | 3/2007 | Fang | G06F 21/565 |
| | | | 714/100 |
| 2007/0192329 A1* | 8/2007 | Croft et al. | 707/10 |
| 2007/0220187 A1* | 9/2007 | Kates | 710/62 |
| 2008/0028457 A1* | 1/2008 | Diaz-Cuellar et al. | 726/12 |
| 2008/0109473 A1* | 5/2008 | Dixon et al. | 707/102 |
| 2008/0250473 A1* | 10/2008 | Massimiliano | G06F 8/61 |
| | | | 726/1 |
| 2009/0288167 A1* | 11/2009 | Freericks et al. | 726/23 |
| 2009/0328220 A1* | 12/2009 | Abdel-Aziz et al. | 726/24 |

OTHER PUBLICATIONS

Cisco, "Cisco ASA 5510 Model", internet: "https://flylib.com/books/en/2.464.1/cisco_asa_5510_model.html", 2005, p. 1-8.*

Quan Huang, Shengke Qiu, Shicun Qin and Cheng Cao, "An embedded firewall based on network processor," Second International Conference on Embedded Software and Systems (ICESS'05), Xian, China, 2005, pp. 7 pp. (Year: 2005).*

"Firewall," Wikipedia, last modified on Jul. 29, 2008, http://en.wikipedia.org/wiki/Firewall.

* cited by examiner

SYSTEM, METHOD, AND COMPUTER PROGRAM PRODUCT FOR MANAGING A CONNECTION BETWEEN A DEVICE AND A NETWORK

FIELD OF THE INVENTION

The present invention relates to network connections, and more particularly to managing network connections.

BACKGROUND

Traditionally, network connections have been managed for allowing and preventing, as desired, communication with a network. Oftentimes, such network connections are managed for security purposes, such as for preventing unwanted communications via the network connections. However, conventional techniques for managing network connections have exhibited various limitations.

Just by way of example, when an operating system of a device is first installed, the device is usually extremely vulnerable to attack and infections from within a local network and/or from a remote network. Generally, such vulnerability is a result of the device not having an up-to-date security system (e.g. requiring security updates, etc.). Thus, the device may be vulnerable until a connection to a network is made for retrieving an up-to-date security system.

Unfortunately, conventional techniques for managing network connections have failed to adequately address security for these types of vulnerable devices. For example, hardware firewalls have conventionally been used for managing network connections for security purposes. However, hardware firewalls have generally only protected a local network from remote networks, thus failing to address potential attacks/infections of a device from within the local network. There is thus a need for addressing these and/or other issues associated with the prior art.

SUMMARY

A system, method, and computer program product are provided for managing a connection between a device and a network. In use, a first device coupled between a second device and a network is identified. Further, the first device is controlled based on predefined criteria utilizing the second device, for managing a connection between the second device and the network.

DETAILED DESCRIPTION

Figure 1:
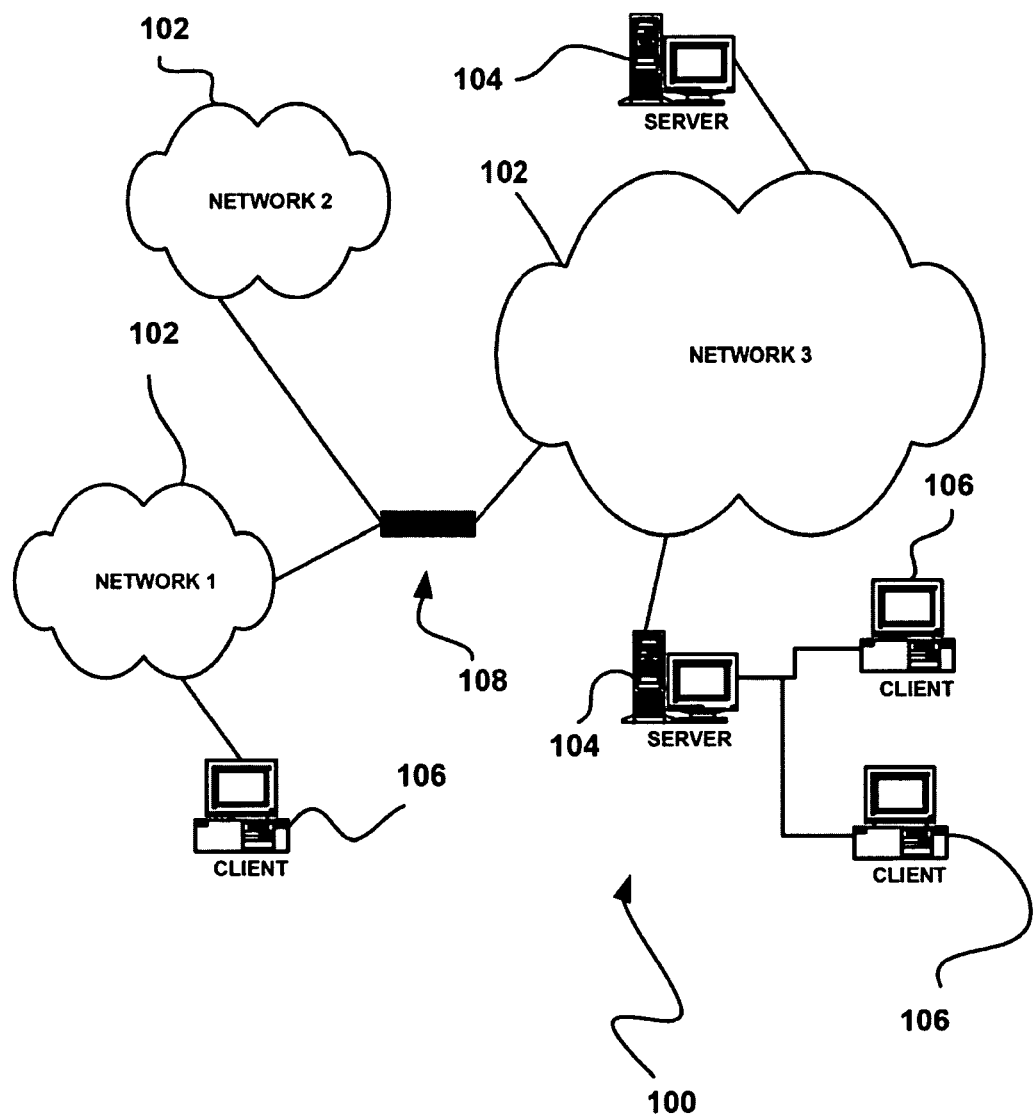
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
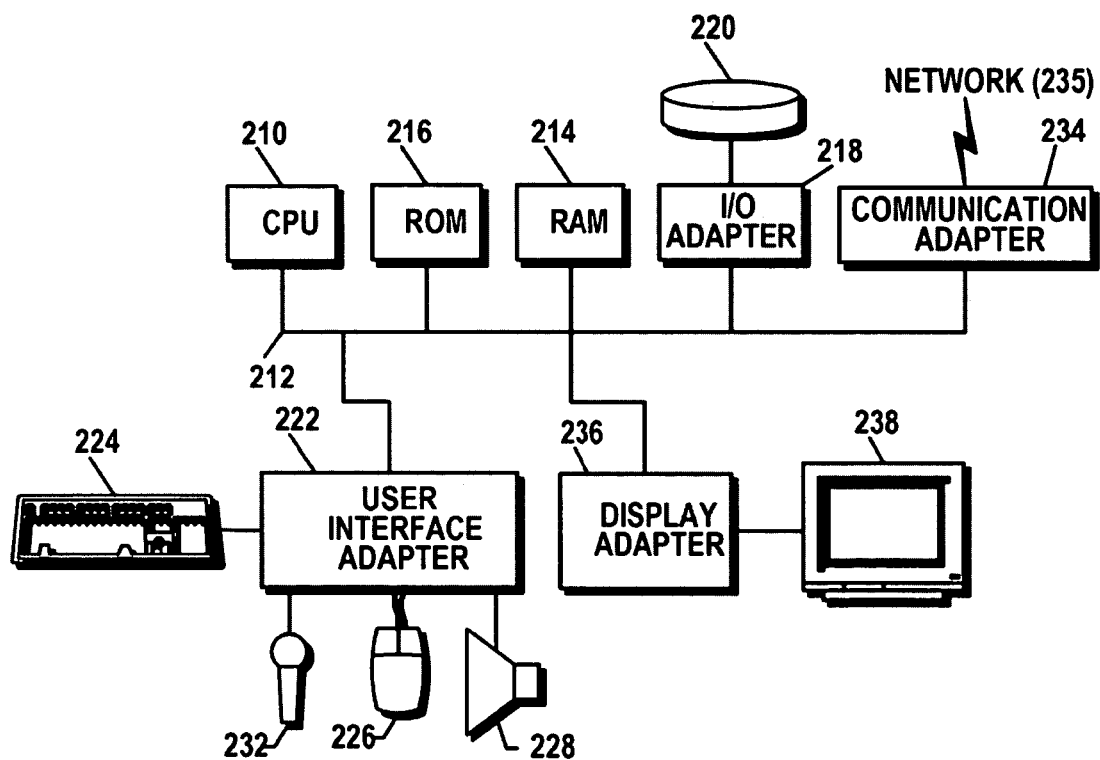
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
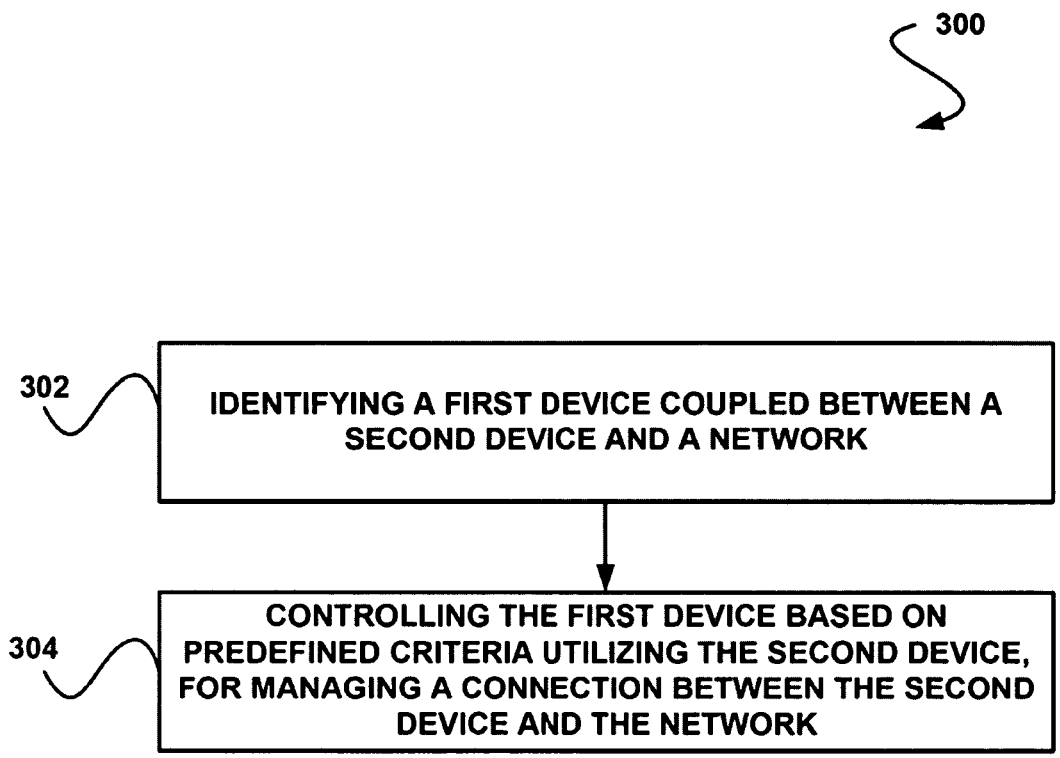
FIG. 3 shows a method for managing a connection between a device and a network, in accordance with one embodiment.

FIG. 3 shows a method 300 for managing a connection between a device and a network, in accordance with one embodiment. As an option, the method 300 may be carried out in the context of the architecture and environment of FIGS. 1 and/or 2. Of course, however, the method 300 may be carried out in any desired environment.

As shown in operation 302, a first device coupled between a second device and a network is identified. The network may include any network over which communications (e.g. data, etc.) may be transmitted. For example, the network may include any of the networks described above with respect to FIG. 1.

Additionally, with respect to the present description, the second device may include any device capable of communicating with the network (e.g. via the first device). In one embodiment, the second device may include a client computer. Of course, however, the second device may include any of the devices described above with respect to FIGS. 1 and/or 2.

Further, the first device that is coupled between the second device and the network may include a physical module coupled between the second device and the network and via which the second device communicates with the network. Thus, for example, the first device may include a first connection (e.g. first physical connection) with the second device. In addition, the first device may include a second connection (e.g. second physical connection) with the network, such that communication between the second device and the network may be allowed utilizing (e.g. over, etc.) the first connection and the second connection. Such first connection and/or second connection may be provided by way of an Ethernet cable, as an option.

In one embodiment, the first device may be coupled between the second device and the network via ports of the first device. Accordingly, one of the ports of the first device may optionally connect with the second device, such as with a port of the second device (e.g. by way of a cable situated therebetween), and another one of the ports of the first device may connect with the network, such as with a port of a switch (e.g. gateway) located on the network (e.g. by way of a cable situated therebetween). The ports may include registered jack 45 (RJ-45) ports, just by way of example. Of course, it should be noted that the first device may be coupled between the second device and the network in any desired manner.

Moreover, the first device coupled between the second device and the network may be identified in any manner. In one embodiment, the first device may be identified utilizing an application (e.g. firewall application, etc.) installed on the second device. Such application may optionally monitor the second device (e.g. at least one port of the second device) for detecting a coupling (e.g. a connection) between the second device and the first device.

Still yet, as shown in operation 304, the first device is controlled utilizing the second device based on predefined criteria, for managing a connection between the second device and the network. In one embodiment, the application installed on the second device, as described above, may control the first device based on the predefined criteria. Of course, any other computer code may be executed by the second device for controlling the first device.

With respect to the present description, controlling the first device may include controlling any aspect of the first device. In one embodiment, controlling the first device may include controlling a connection between the first device and the network. For example, the second device may instruct the first device to enable (e.g. allow) communication with the network. As an option, the second device may instruct the first device to only enable predetermined communications with the network, such as to only enable communications sent from the second device to the network, to only enable communications sent from the network that are responsive to a request received from the second device, to only enable communications sent from the second device to predefined locations (e.g. websites, etc.) on the network (e.g. websites predefined as secure, predefined as meeting a security threshold, for example, based on a security ranking of such websites, websites predetermined to be utilized for providing security applications and/or security application updates), etc.

As another example, the second device may instruct the first device to disable (e.g. block) communication with the network. Optionally, the second device may instruct the first device to only disable predetermined communications with the network. In various embodiments, such predetermined communications may include communications sent to the second device from the network that are not responsive to a request issued by the second device, communications sent by the second device to predefined locations on the network (e.g. predefined locations on the network that are predetermined to be unsecure), etc.

Furthermore, the predefined criteria based on which the first device is controlled by the second device may include any rules, policies, etc. In one embodiment, the predefined criteria may include a detection of unwanted data (e.g. malware, etc.) on the second device, detection of unwanted data sent from the second device (e.g. or attempted to be sent from the second device to the network), detection of unwanted data sent from the network to the second device, etc. Thus, for example, the second device may instruct the first device to disable communication with the network if the unwanted data is detected on the second device, as being received from the network, etc.

In another embodiment, the predefined criteria may include a determination that the second device does not have a security system installed thereon, or optionally that a security system installed on the second device does not include a latest available update (e.g. from a provider of the security system). Such determination may be made based on a scan of the second device. To this end, the second device may instruct the first device to disable communication (or predetermined communications) with the network if it is determined that the second device does not have a security system installed thereon, does not include a latest available update for a security system installed thereon, etc.

Controlling the first device based on the predefined criteria may thus allow a connection between the second device and the network to be managed (e.g. enabled, disabled, etc.). For example, such connection may be managed by controlling the first device to enable or disable a connection between the first device and the network, thereby enabling or disabling a connection between the second device and the network via the first device. Providing the connection management in this manner may optionally be utilized to ensure security of the second device (e.g. against unwanted data being received by the second device over the network), of remote devices in communication with the second device via the network (e.g. against unwanted data being received by the remote device from the second device over the network), etc. In this way, the first device may optionally protect the second device and/or any other devices in communication with the network from unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
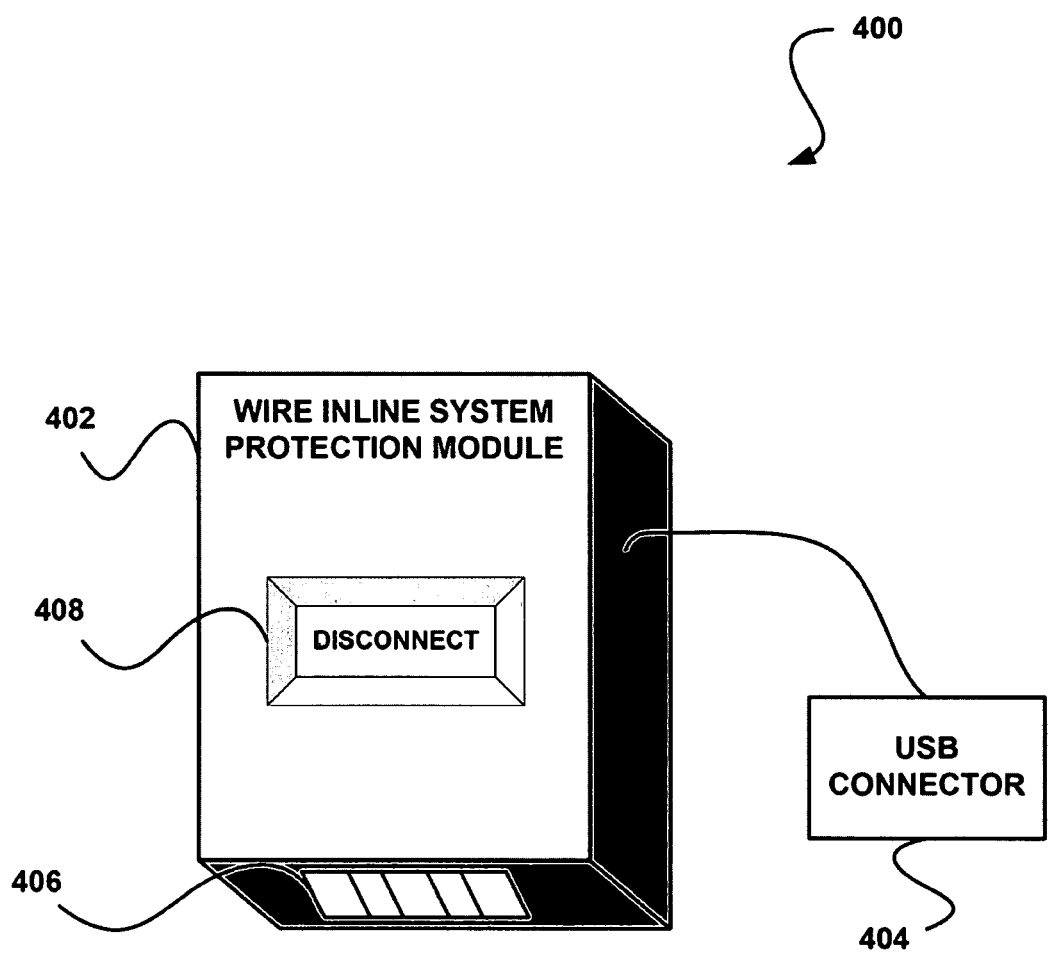
FIG. 4 shows a system for managing a connection between a device and a network, in accordance with another embodiment.

FIG. 4 shows a system 400 for managing a connection between a device and a network, in accordance with another embodiment. As an option, the system 400 may be implemented in the context of the architecture and environment of FIGS. 1-3. For example, the system 400 may be implemented in the context of the first device described above with respect to FIG. 3. Of course, however, the system 400 may be implemented in any desired environment. It should also be noted that the aforementioned definitions may apply during the present description.

As shown, the system 400 includes a wire inline system protection module 402 (hereinafter protection module 402).

The protection module 402 includes a first port 406 situated thereon for connecting the protection module 402 to a remote device. For example, the first port 406 may connect the protection module 402 to a client computer (e.g. the second device described above with respect to FIG. 3).

In one embodiment, the first port 406 may include an RJ-45 port. In another embodiment, the protection module 402 may connect to the remote device by coupling a cable (e.g. Ethernet cable, etc.) between a port of the remote device and the first port 406 of the protection module 402. In this way, the protection module 402 may be in communication with the remote device by way of the first port 406.

As an option, the protection module 402 may also include a second port (not shown) situated thereon. The second port may be utilized for connecting the protection module 402 to a network (e.g. the network described above with respect to FIG. 3). For example, the second port may connect the protection module 402 to a switch associated with the network. As an option, the second port may also include an RJ-45 port. Accordingly, the protection module 402 may connect to the network by coupling a cable (e.g. Ethernet cable, etc.) between the network (e.g. a port of the switch) and the second port of the protection module 402. Thus, the protection module 402 may be in communication with the network by way of a second port.

Of course, while various examples of connections with the protection module 402 have been described above, it should be noted that the protection module 402 may include any desired type of connections with a remote device and a network, such that the protection module 402 is coupled between the remote device and the network. In one embodiment, the coupling of the protection module 402 between the remote device and the network may allow network communications between the remote device and the network. For example, network communications from the network to the remote device and/or from the remote device to the network may be provided over the protection module 402 by way of the connections of the protection module 402 with the remote device and the network.

As also shown, the protection module 402 includes a universal serial bus (USB) connector 404. The USB connector 404 may include any USB component capable of connecting with another USB component. For example, the USB connector 404 may include a cable capable of being coupled to a USB port. As another example, the USB connector 404 may include a USB port to which a USB cable may coupled.

In one embodiment, the USB connector 404 may be utilized for providing power to the protection module 402. As an option, any device that is connected to the protection module 402 via the USB connector 404 may provide the power to the protection module 402. Such device may include the client device described above, for example.

In another embodiment, the USB connector 404 may be utilized to control the protection module 402. Such control may be utilized for managing a connection between the remote device and the network, with respect to the present embodiment. Also with respect to the present embodiment, the remote device described above may be connected to the protection module 402 via the USB connector 404 for controlling the protection module 402. In this way, the protection module 402 may only be controlled by the remote computer, and not via the network for preventing network-based vulnerabilities.

For example, instructions for controlling the protection module 402 may be sent to the protection module 402 from the remote device via the USB connector 404. The instructions may instruct the protection module 402 to disable or enable communications with the network (e.g. by enabling or disabling the first port 406 and/or the second port). With respect to the present embodiment, the instructions may be selected based on predefined criteria (e.g. a security status of the remote device, etc.).

Furthermore, the protection module 402 includes a disconnect button 408. The disconnect button 408 may include any type of physical switch on the protection module 402 that is capable of being selected (e.g. manipulated, pushed, etc.) by a user of the protection module 402. In one embodiment, the disconnect button 408 may control a connection between the remote device and the network. For example, upon selection of the disconnect button 408 by the user, the protection module 402 may automatically disable the connection with the network (e.g. by disabling the second port, etc.). In this way, the remote device connected to the protection module 402 may be prevented from sending and receiving network communications via the network, in response to selection of the disconnect button 408 by the user.

Figure 5:
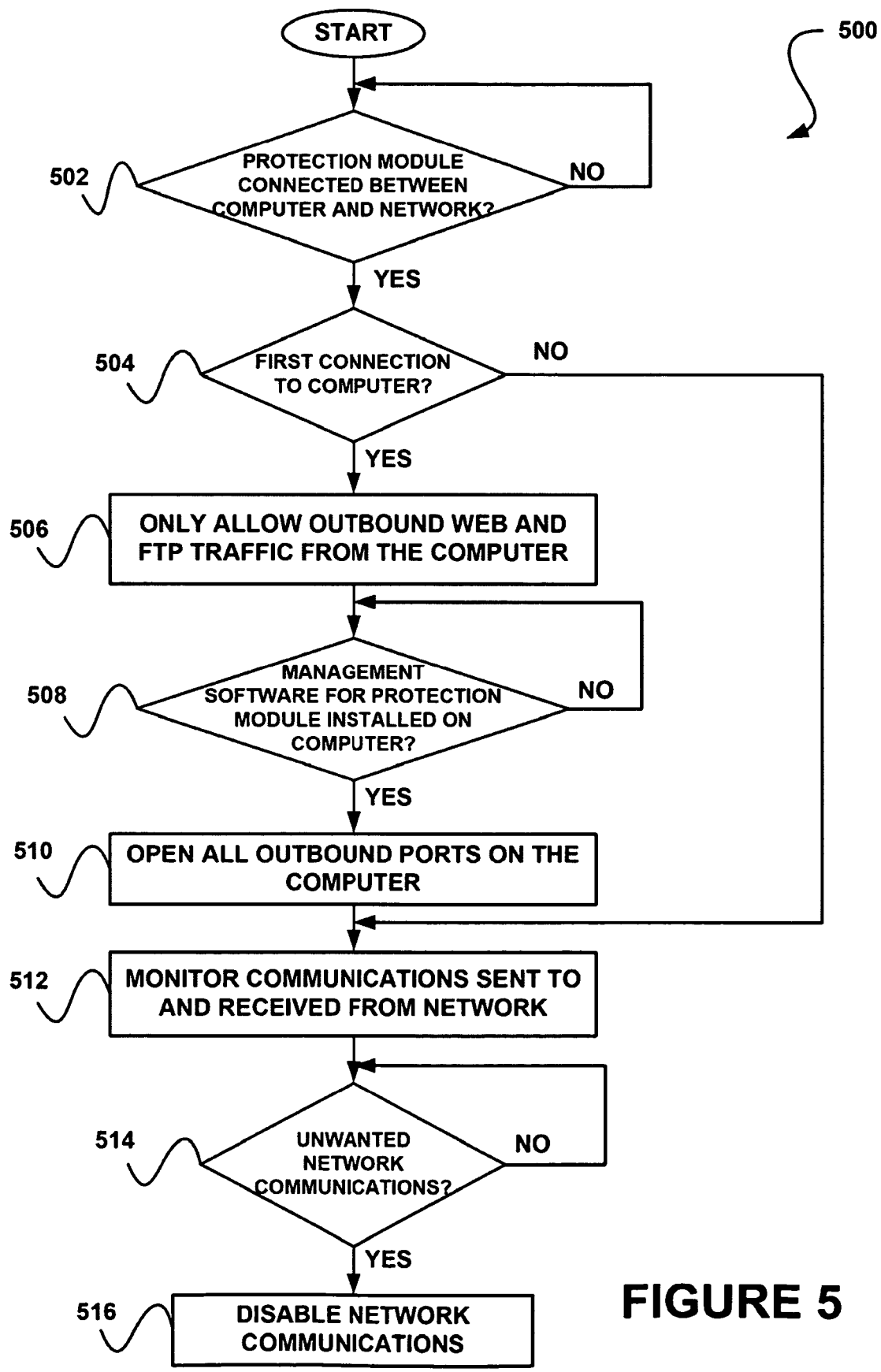
FIG. 5 shows a method for disabling network communications, in accordance with yet another embodiment.

FIG. 5 shows a method 500 for disabling network communications, in accordance with yet another embodiment. As an option, the method 500 may be carried out in the context of the architecture and environment of FIGS. 1-3. For example, the method 500 may be carried out utilizing the protection module 402 and/or an application of the remote device described above with respect to FIG. 4. Of course, however, the method 500 may be carried out in any desired environment. Again, it should be noted that the aforementioned definitions may apply during the present description.

As shown in decision 502, it is determined whether a protection module is connected between a computer and a network. In one embodiment, the computer may include the remote device described above with respect to FIG. 4. For example, the computer may be connected to the protection module via a port of the protection module.

As an option, an application installed on the computer may determine whether the protection module is connected between the computer the network. Such determination may be made by sending a request utilizing at least one port of the computer that is capable of being connected to the protection module. The request may request from the protection module an acknowledgement of receipt of at least one packet associated with the request, in one embodiment.

If an acknowledgement is received from the protection module via such port, it may be determined that the protection module is connected to the computer. However, if the acknowledgement is not received from the protection module, it may be determined that the protection module is not connected to the computer.

In another embodiment, another request may be sent to the computer upon the determination that the protection module is connected to the computer. The other request may request from the protection module an indication of whether the protection module is connected to the network. Thus, if a response is received from the protection module indicating that a connection to the network exists, it may be determined that the protection module is connected between the computer and the network.

However, if a response is received from the protection module indicating that a connection to the network does not exist, it may be determined that the protection module is not connected between the computer and the network. If it is determined that the protection module is not connected between the computer and the network, the method 500 continues to wait for the protection module to be connected between the computer and the network. For example, the method 500 may include periodically polling the protection module for an indication that the protection module is connected between the computer and the network.

If it is determined that protection module is connected between the computer and the network, it is further determined whether a connection between the computer and the protection module is a first connection. Note decision 504. With respect to the present embodiment, the connection between the computer and the protection module may be a first connection if the computer has not previously been connected to the protection module.

If it is determined that the connection between the computer and the protection module is a first connection, only outbound web and file transfer protocol (FTP) traffic is allowed from the computer, as shown in operation 506. For example, only web and FTP traffic may be allowed to be sent from the computer to the network via the protection module. As an option, such web and FTP traffic may only be allowed to be sent to predetermined locations on the network. Such predetermined locations may include websites predetermined to provide security applications (e.g. firewalls, etc.) and/or updates to such security applications.

Moreover, network traffic may be allowed to be received from the network by the computer via the protection module if such network traffic is responsive to the web or FTP traffic sent by the computer. For example, if the network traffic includes an acknowledgement to a request sent by the computer, such network traffic may be allowed to be received by the computer. In this way, the computer may be allowed to receive network traffic from the predetermined locations on the network to which the computer sends a request. For example, the computer may be allowed to receive security applications, security application updates, etc. from the network.

Additionally, as shown in decision 508, it is determined whether management software for the protection module is installed on the computer. The management software may include any code for managing the protection module. For example, the management software may include predetermined criteria based on which the protection module is to be controlled.

In one embodiment, the management software may be installed on the computer by way of an input device [e.g. Compact Disc read-only memory (CDROM)] of the computer. In another embodiment, the management software may be installed on the computer from the network. For example, the management software may be downloaded from a website that is a predetermined location on the network, in response to a request for such management software from the computer.

As an option, determining whether the management software for the protection module is installed on the computer may include scanning the computer for the management software. As another option, determining whether the management software for the protection module is installed on the computer may include scanning a registry of the computer for an indication that the management software is installed on the computer. Of course, however, it may be determined whether the management software for the protection module is installed on the computer in any desired manner.

If it is determined that the management software for the protection module is not installed on the computer, the method 500 continues to wait for such management software to be installed on the computer. Additionally, the protection module may continue to only allow the outbound web and FTP traffic from the computer, as described above.

If it is determined that the management software for the protection module is installed on the computer, all outbound ports on the computer are opened. Note operation 510. For example, the protection module may be instructed to allow all network traffic from the computer to be communicated to the network.

Still yet, in response to the opening of the outbound ports on the computer (operation 510), or in response a determination that a connection between the computer and the protection module is not a first connection (decision 504), communications sent to and received from the network are monitored, as shown in operation 512. With respect to the present embodiment, the communications may be monitored for detecting unwanted network communications. Such unwanted network communications may include network communications that violate a preconfigured rule, policy, etc.

For example, the unwanted network communications may include network communications that include malware. As another example, the unwanted network communications may include network communications that are associated with websites predetermined to be associated with unwanted network communications. As yet another example, the unwanted network communications may include network communications from the network that are not responsive to a request issued by the computer.

Thus, the communications may optionally be monitored by comparing the communications sent to or received from the network with preconfigured rules, policies, etc. Of course, however, the communications may be monitored in any desired manner. Also, it is determined whether the communications include unwanted network communications, as shown in decision 514.

If it is determined that the communications do not include unwanted network communications, the method 500 continues to monitor communications sent to and received from the network. If, however, it is determined that the communications do include unwanted network communications, network communications between the computer and the network are disabled. Note operation 516.

In one embodiment, the network communications may be disabled by instructing the protection module to disable the connection between the protection module and the network. Of course, however, the network communications may be disabled in any desired manner. In this way, the computer may be prevented from sending or receiving unwanted network communications via the protection module.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory, computer readable medium, and for controlling a first device to be coupled between a second device and a network, the computer program product, when executed, causing the second device to perform a method comprising:

determining the first device is connected between the second device and the network;

instructing the first device to only enable communications sent from the second device to the network and communications from the network that include an acknowledgement to a request sent by the second device, based on a determination that the second device has not previously been connected to the first device;
instructing the first device to allow all network traffic from the second device to be communicated to the network, based on a determination that management software for managing the first device is installed on the second device; and
instructing the first device to disable communications with the network, based on a detection of unwanted data sent from the network to the second device.

2. The computer program product of claim 1, wherein the communications sent from the second device are for websites or file transfer protocol (FTP) sites.

3. The computer program product of claim 1, the method further comprising:
performing a control of the first device based on a detection of unwanted data on the second device, a determination that the second device does not have a security system installed, or a determination that the second device does not include a predetermined update for the security system.

4. The computer program product of claim 3, wherein the control is disabling communications with the network.

5. The computer program product of claim 1, the method further comprising:
downloading the management software from a website, based on a request for the management software from the second device.

6. A method for controlling a first device to be coupled between a second device and a network, comprising:
determining the first device is connected between the second device and the network;
instructing the first device to only enable communications sent from the second device to the network and communications from the network that include an acknowledgement to a request sent by the second device, based on a determination that the second device has not previously been connected to the first device;
instructing the first device to perform an allowance of all network traffic from the second device to be communicated to the network, based on a determination that management software for managing the first device is installed on the second device; and
instructing the first device to disable communications with the network, based on a detection of unwanted data sent from the network to the second device.

7. The method of claim 6, wherein the communications sent from the second device are for websites or file transfer protocol (FTP) sites.

8. The method of claim 6, further comprising:
performing a control of the first device based on a detection of unwanted data on the second device, a determination that the second device does not have a security system installed, or a determination that the second device does not include a predetermined update for the security system.

9. The method of claim 8, wherein the control is disabling communications with the network.

10. The method of claim 6, further comprising:
downloading the management software from a website, based on a request for the management software from the second device.

11. The method of claim 6, further comprising:
monitoring communications sent to and received from the network, based on a determination that the second device has previously been connected to the first device.

12. The method of claim 6, further comprising:
monitoring communications sent to and received from the network in response to the allowance.

13. A system for controlling a first device to be coupled between a second device and a network, comprising:
a memory configured to store instructions; and
a processor configured to execute the instructions to
determine the first device is connected between the second device and the network;
instruct the first device to only enable communications sent from the second device to the network and communications from the network that include an acknowledgement to a request sent by the second device, based on a determination that the second device has not previously been connected to the first device;
instruct the first device to allow all network traffic from the second device to be communicated to the network, based on a determination that management software for managing the first device is installed on the second device; and
instruct the first device to disable communications with the network, based on a detection of unwanted data sent from the network to the second device.

14. The system of claim 13, wherein the second device provides power to the first device via a universal serial bus (USB) connector.

15. The system of claim 13, wherein the communications sent from the second device are for websites or file transfer protocol (FTP) sites.

16. The system of claim 13, wherein the second device controls the first device via a universal serial bus (USB) connector.

17. The system of claim 13, wherein the second device performs a control of the first device based on a detection of unwanted data on the second device, a determination that the second device does not have a security system installed, or a determination that the second device does not include a predetermined update for the security system.

18. The system of claim 17, wherein the control is disabling communications with the network.

19. The system of claim 13, wherein the second device downloads the management software from a website, based on a request for the management software from the second device.

20. The system of claim 13, wherein the determination that the management software is installed on the second device includes a scanning of a registry of the second device.

* * * * *